I. V. Adair.
Excavator.
No. 70,772. Patented Nov. 12, 1867.
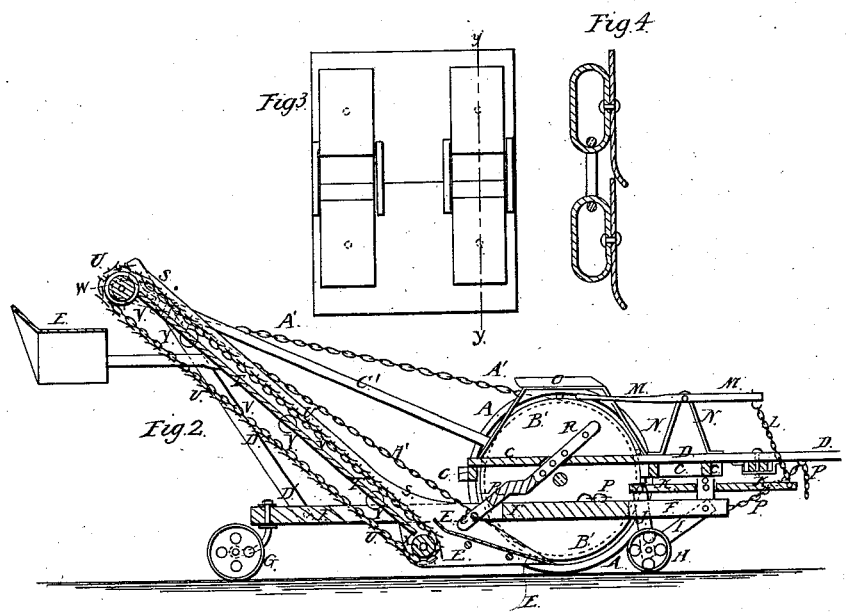
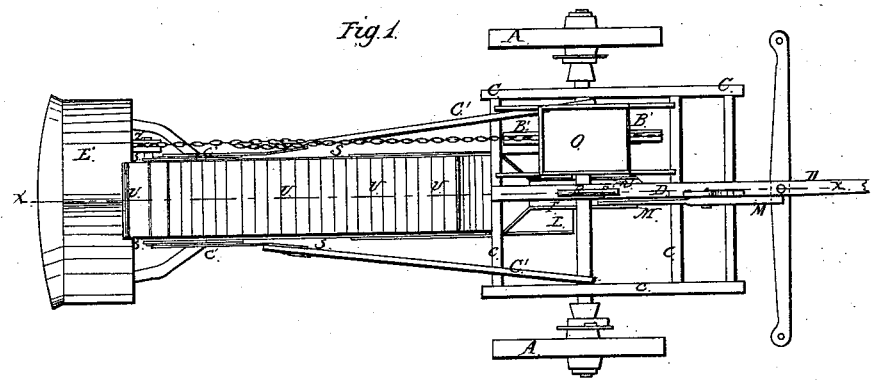
Witnesses:
Theo Tische
J. A. Service
Inventor:
I. V. Adair
Per Munn & Co.
Attorneys

United States Patent Office.

ISAAC V. ADAIR, OF VARICK, NEW YORK, ASSIGNOR TO HIMSELF AND PETER WYCKOFF, OF THE SAME PLACE.

Letters Patent No. 70,772, dated November 12, 1867.

IMPROVEMENT IN DITCHING MACHINES.

The Schedule referred to in these Letters Patent and making part of the same.

TO ALL WHOM IT MAY CONCERN:

Be it known that I, ISAAC V. ADAIR, of Varick, in the county of Seneca, and State of New York, have invented a new and improved Excavator or Ditching Machine; and I do hereby declare that the following is a full, clear, and exact description thereof, which will enable others skilled in the art to make and use the same, reference being had to the accompanying drawings, forming part of this specification, in which—

Figure 1 is a top view of my improved machine.

Figure 2 is a vertical longitudinal section of the same, taken through the line $x\ x$, fig. 1.

Figure 3 is a detail view of a portion of an endless chain of buckets.

Figure 4, a detail sectional view of the same, taken through the line $y\ y$, fig. 3.

Similar letters of reference indicate like parts.

My invention has for its object to furnish an improved machine designed especially for use in removing the earth from ditches after it has been loosened by a ditching-plough; and it consists in the combination and arrangement of the various parts of the machine, as hereinafter more fully described.

A are the wheels of the truck, to the inner ends of the hubs of which are attached pawls or clutches, which take hold of teeth formed upon or attached to the axle B, so that, when the wheels move forward, they carry the axle with them in their revolution, but when they move backward may be free to turn upon the axle. C is the truck-frame, which rests and rides upon the axle B, and to which the tongue D is attached. E is the shoe or digger, which is made of steel plates bolted together, and which is pivoted to the frame F by the bolt $e'$. The rear end of the frame F is supported upon a caster-wheel, G; and its front end is supported upon an adjustable gauge-wheel, H, which is pivoted to the straps I and J. The upper ends of the straps I are pivoted to the forward end of the frame F; and the upper ends of the straps J are pivoted to the rear end of the lever K, the middle part of which is adjustably pivoted to the forward end of the frame F. L is a chain, the lower end of which is attached to the forward end of the lever K, and its upper end hooks upon a hook attached to the forward end of the lever M. The middle part of the lever M is pivoted to a support, N, attached to the frame C; and its rear end extends back into such a position as to be reached and operated by the driver from his seat O, for the purpose of raising and lowering the forward end of the frame F, and thus regulating the depth of the cut. P is the draught-chain, the forward end of which is attached to the tongue D, and its rear end to the frame F. R is an adjustable connecting-bar, the rear end of which is pivoted to the bolt $e'$; and its upper end is secured in a slot in the frame C by a pin, $d'$, passing through one or the other of the holes through the said bar above the said frame. S are the side bars of the elevator, which are continuous with the sides or flanges of the shoe or digger E, and which are securely attached to the side edges of the inclined apron T. U are the buckets, which are formed by attaching bars or plates of metal having their lower edges turned up to the endless chains V. The chains V pass around the pulleys W and X, which are pivoted to the upper and lower ends of the elevator-frame S. The upper pulley or roller W has prongs or spurs attached to its surface, which take hold of the links of the endless chains V, and carry them up. Y are friction-pulleys or rollers, pivoted to the inclined apron T, upon which the loaded buckets move upward. To one end of the axle of the pulley W is attached a pulley, Z, around which passes a band or chain, A'. The band or chain A' also passes around the pulley B', attached to the axle B, so as to operate the elevator by the revolution of the said axle. C' are brace-bars, the lower ends of which are attached to and ride upon the axle B; and their upper ends are adjustably connected to the upper end of the frame S. D' are brace-bars, the lower ends of which are attached to the rear end of the frame F; and their upper ends are adjustably connected to the frame S, so that, by adjusting the upper ends of the bars C' and D', the inclination of the elevator may be varied as desired. E' is an apron or guide-spout, inclining to each side, which receives the dirt from the endless chain of buckets, and guides it to the sides of the ditch.

What I claim as new, and desire to secure by Letters Patent, is—

1. The arrangement of the wheels A, axles B, frame C, pulley B', band A', endless chain of buckets U, frame S, adjustable brace-bars C' and D', and frame F, with each other, substantially as herein shown and described and for the purpose set forth.

2. The frames F and C, when connected together by the adjustable bar R and draught-chain P, substantially as herein shown and described and for the purpose set forth.

3. The combination of the gauge-wheel H, straps I and J, lever K, chain L, and lever M, with each other, and with the frames C and F, substantially as herein shown and described and for the purpose set forth.

ISAAC V. ADAIR.

Witnesses:
J. WYCKOFF,
PIERSON JACOBUS.